United States Patent

Wada

[11] Patent Number: 6,085,713
[45] Date of Patent: Jul. 11, 2000

[54] INTAKE MANIFOLD FOR ENGINES

[75] Inventor: Tetsu Wada, Wako, Japan

[73] Assignee: Honda Giken Kogyo Kabushiki Kaisha, Tokyo, Japan

[21] Appl. No.: 09/308,674

[22] PCT Filed: Dec. 19, 1997

[86] PCT No.: PCT/JP97/04700

§ 371 Date: Jun. 4, 1999

§ 102(e) Date: Jun. 4, 1999

[87] PCT Pub. No.: WO98/27331

PCT Pub. Date: Jun. 25, 1998

[30] Foreign Application Priority Data

Dec. 19, 1996 [JP] Japan ..................................... 8-340217
Dec. 19, 1996 [JP] Japan ..................................... 8-340220

[51] Int. Cl.[7] ............................. B63H 21/26; F02B 67/00
[52] U.S. Cl. ..................................................... 123/184.42
[58] Field of Search ........................ 123/184.21, 184.24, 123/184.42, 184.47, 184.59

[56] References Cited

U.S. PATENT DOCUMENTS

5,816,209 10/1998 Kato ..................................... 123/194.59
5,829,402 11/1998 Takahashi et al. ................. 123/184.24

Primary Examiner—Marguerite McMahon
Attorney, Agent, or Firm—Arent Fox Kintner Plotkin & Kahn, PLLC

[57] ABSTRACT

An intake manifold 85 for an engine E, which is provided with a cylinder head 8, a cylinder block 6 and a crankcase 7 and in which a crankshaft 15 is supported vertically, comprises in an integral manner a mounting flange 84 connected to the cylinder head 8, a plurality of intake pipes 83a, a surge tank 82, and an elbow 81 connected to a throttle body 80 disposed forwardly of the crankcase 7. The surge tank 82 disposed on a side of the crankcase 7 can be connected through the elbow 81 to the throttle body 80 and an intake silencer 76 disposed in a space forwardly of the crankcase 7, so that the entire engine can be made compact.

4 Claims, 7 Drawing Sheets

INTAKE MANIFOLD FOR ENGINES

FIELD OF THE INVENTION

The present invention relates to an intake manifold in an engine having a crankshaft disposed substantially vertically, the engine including an intake manifold disposed along a side of a cylinder block, a surge tank and a plurality of intake pipes.

BACKGROUND ART

A multi-cylinder engine in an outboard engine system having a crankshaft disposed vertically is known from Japanese Patent Application Laid-open No. 5-60024, which comprises a plurality of intake pipes connected to a cylinder head respectively, a surge tank connected to upstream ends of the intake pipes, a throttle body connected to an upstream end of the surge tank, and a throttle guide connected to an upstream end of the throttle body.

The multi-cylinder engine described in Japanese Patent Application Laid-open No. 5-60024 suffers from a problem that the front end of the throttle guide largely protrudes forwards from an end of a crankcase, resulting in an increase in size of the entire engine, or only a small throttle guide can be mounted, because each of the intake pipes, the surge tank, the throttle body and the throttle guide are disposed substantially rectilinearly. Moreover, such known multi-cylinder engine also has a problem that a sufficient silencing effect cannot be expected, because it is difficult to ensure a space for disposition of an intake silencer of a large volume. Further, in the known multi-cylinder engine, three upper intake pipes other than a lowermost intake pipe are formed into an upward-convex arcuate shape and hence, an uppermost one of the intake pipes protrudes upwards from an upper surface of the cylinder block, thereby providing a possibility that such protrusion may influence the layout of the other components.

A multi-cylinder engine in an outboard engine system having a crankshaft disposed vertically is also known from Japanese Patent Application Laid-open No. 4-166496, in which a plurality of intake pipes connected to cylinders respectively and an intake chamber connected to upstream ends of the intake pipes are disposed along a side of a cylinder block.

In the multi-cylinder engine described in Japanese Patent Application Laid-open No. 4-166496, the intake pipes are disposed in parallel to one another at a given inclination angle and hence, it is easy to equally set the lengths of the intake pipes. However, there is a case wherein it is difficult to dispose the plurality of intake pipes in parallel to one another at the given inclination angle when taking account of the layout within an engine room and the plurality of intake pipes are forcibly disposed to extend radiately from a surge tank toward the cylinders which are disposed side by side in a vertical arrangement. If the intake pipes are disposed in this manner, the lengths of the intake pipes disposed horizontally to extend from the surge tank toward the cylinders are shortened, while the lengths of the intake pipes disposed inclined from the surge tank toward the cylinders are prolonged. Thus, the lengths of the intake pipes are non-uniform. If the lengths of the intake pipes are non-uniform in the multi-cylinder internal combustion engine in this manner, the following problem is encountered: it is difficult to effectively exhibit a pulsating effect of an intake system, thereby bringing about a hindrance to an increase in output from the engine.

SUMMARY OF THE INVENTION

The present invention has been accomplished with the above circumstances in view, and it is a first object of the present invention to ensure that the size of the entire engine can be reduced and a space for disposition of an intake silencer can be obtained, by reducing the size of the intake manifold, and the throttle body can easily be supported.

It is a second object of the present invention to provide an intake manifold including a plurality of intake pipes extending at different inclination angles from a surge tank, wherein the lengths of the intake pipes are substantially uniform.

To achieve the first object, according to a first aspect and feature of the present invention, there is provided an intake manifold in an engine having a crankshaft supported substantially vertically in an engine block comprised of a cylinder head, a cylinder block and a crankcase, and an intake silencer and a throttle body which are disposed on a side of the crankcase intersecting a cylinder axis, characterized in that the intake manifold is integrally comprised of a mounting flange connected to a mounting surface of the cylinder head, a plurality of intake pipes extending side by side along the cylinder axis from the mounting flange to a side of the cylinder block, a surge tank which is disposed on a side of the crankcase that is on the same side as the side of the cylinder block, upstream ends of the intake pipes being connected to the surge tank, and a substantially L-shaped elbow which connects the throttle body disposed on the side of the crankcase intersecting the cylinder axis to an upstream end of the surge tank.

With the above arrangement, the intake manifold is integrally provided with the mounting flange connected to the mounting surface of the cylinder head, the plurality of intake pipes extending side by side along the cylinder axis from the mounting flange to the side of the cylinder block, the surge tank which is disposed on the side of the crankcase that is on the same side as the side of the cylinder block and to which upstream ends of the intake pipes are connected, and the substantially L-shaped elbow which connects the throttle body disposed on the side of the crankcase intersecting the cylinder axis to the upstream end of the surge tank. Therefore, the surge tank and the throttle body can be disposed on the side of the crankcase along the cylinder axis and on the side of the crankcase intersecting the cylinder axis, respectively, thereby making the entire engine compact. Moreover, the intake silencer can be disposed on the side of the crankcase intersecting the cylinder axis and hence, the volume of the intake silencer can be ensured to enhance the silencing effect. Further, the throttle body can be supported by the elbow integrally formed on the intake manifold.

To achieve the first object, according to a second aspect and feature of the present invention, in addition to the first feature, there is provided an intake manifold in an engine characterized in that an uppermost one of the plurality of intake pipes is disposed substantially horizontally, and lower intake pipes are disposed at inclination angles to be directed upwards toward the surge tank, with the inclination angles being larger for lower ones of the intake pipes.

With the above feature, the uppermost one of the plurality of intake pipes is disposed substantially horizontally, and lower intake pipes are disposed at inclination angles to be directed upwards toward the surge tank, with the inclination angles being larger for lower ones of the intake pipes. Therefore, it is possible to avoid that the intake pipes protrude to an upper surface of the cylinder block, whereby a space for disposition of other components can be ensured. Moreover, the upstream portions of the intake pipes are not inclined downwards and hence, fuel that has not been supplied into the cylinders is prevented from being accumulated within the intake pipes.

To achieve the first object, according to a third aspect and feature of the present invention, in addition to the second feature, there is provided an intake manifold in an engine characterized in that amounts of offsetting of connections of the upstream ends of the intake pipes with the surge tank from the mounting surface are set, so that the offsetting amount is larger for the upper intake pipe.

With the above feature, the amounts of offsetting of the connections of the upstream end of the intake pipes with the surge tank as measured from the mounting surface of the cylinder head are set, so that the offsetting amount is larger for the upper intake pipe. Therefore, it is possible to compensate for a difference between the lengths of the intake pipes produced due to the different inclination angles of the intake pipes, and to substantially equalize the lengths of all the intake pipes to prevent a reduction in output from the engine.

To achieve the second object, according to a fourth aspect and feature of the present invention, there is provided an intake manifold in an engine having a plurality of cylinders disposed in parallel to one another in an axial direction of a crankshaft and an intake manifold mounted to a mounting surface of a cylinder head in the engine, the intake manifold being integrally comprising a plurality of intake pipes extending along a side of a cylinder block and connected to the cylinders, and a surge tank which is connected with upstream ends of the intake pipes, wherein angles formed by the intake pipes with respect to the axial direction of the cylinders as viewed from a direction perpendicular to the side of the cylinder block are different from one another, characterized in that amounts of offsetting of connections of the upstream ends of the intake pipes with the surge tank from the mounting surface are set so that the offsetting amount is larger for the intake pipe forming a smaller angle with the axial direction of the cylinders.

With the above arrangement, in the intake manifold mounted to the mounting surface of the cylinder head in the engine, the amounts of offsetting of the connections of the upstream ends of the intake pipes with the surge tank from the mounting surface are set so that the offsetting amount is larger for an intake pipe forming a smaller angle with the axial direction of the cylinders. Therefore, it is possible to compensate for a difference between the lengths of the intake pipes produced due to the different inclination angles formed by the intake pipes with the axial direction of the cylinders as viewed from the direction perpendicular to the side of the cylinder block, and to substantially equalize the lengths of all the intake pipes to prevent a reduction in output from the engine.

BRIEF DESCRIPTION OF THE DRAWINGS

FIGS. 1 to 7 show an embodiment of the present invention,

BEST MODE FOR CARRYING OUT THE INVENTION

The mode for carrying out the present invention will now be described by way of an embodiment with reference to FIGS. 1 to 7.

Figure 1:
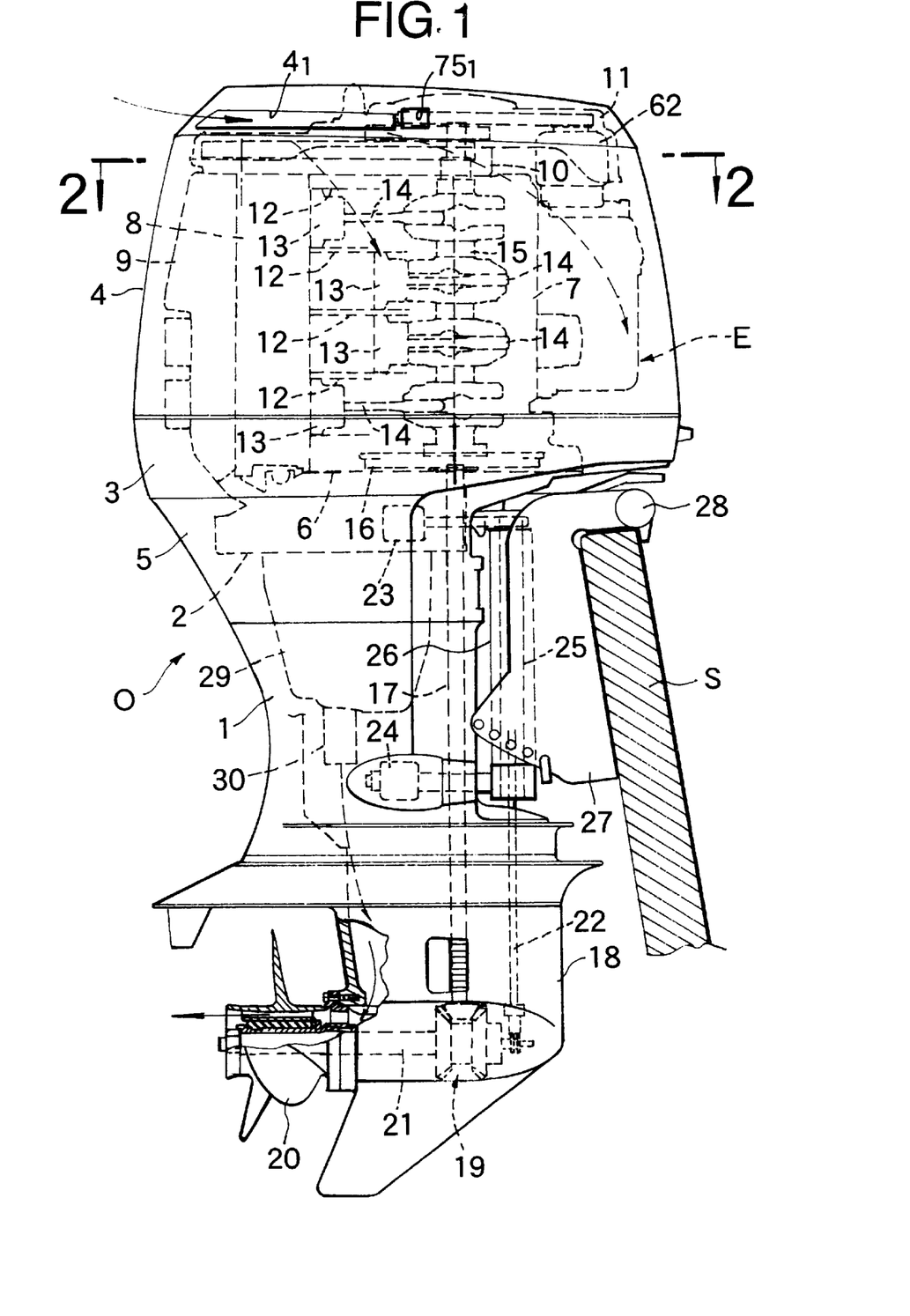
FIG. 1 is a side view of the entire arrangement of an outboard engine system.

As shown in FIG. 1, an outboard engine system O includes a mount case 2 coupled to an upper portion of an extension case 1. A water-cooled serial 4-cylinder and 4-cycle engine E is supported on an upper surface of the mount case 2 with a crankshaft 15 disposed vertically. An under-case 3 having an upper surface opened is coupled to the mount case 2, and an engine cover 4 is detachably mounted on an upper portion of the under-case 3. An under-cover 5 is mounted between a lower edge of the under-case 3 and an edge of the extension case 1 near its upper end so as to cover an outside of the mount case 2.

The engine E includes a cylinder block 6, a crankcase 7, a cylinder head 8, a head cover 9, a lower belt cover 10 and an upper belt cover 11. Lower surfaces of the cylinder block 6 and the crankcase 7 are supported on the upper surface of the mount case 2. Pistons 13 are slidably received in four cylinders 12 defined in the cylinder block 6 and are connected to the crankshaft 15 disposed vertically, through connecting rods 14.

A driving shaft 17 connected to a lower end of the crankshaft 15 along with a flywheel 16 extends downwards within the extension case 1 and is connected at its lower end to a propeller shaft 21 having a propeller 20 at its rear end, through a bevel gear mechanism 19 provided within a gear case 18. A shift rod 22 is connected at its lower end to a front portion of the bevel gear mechanism 19 to change over the direction of rotation of the propeller shaft 21.

A swivel shaft 25 is fixed between an upper mount 23 provided on the mount case 2 and a lower mount 24 provided on the extension case 1. A swivel case 26 for rotatably supporting the swivel shaft 25 is vertically swingably carried on a stern bracket 27 mounted at a stern S through a tilting shaft 28.

An oil pan 29 and an exhaust pipe 30 are coupled to a lower surface of the mount case 2. An exhaust gas discharged from the exhaust pipe 30 into a space within the extension case 1 is discharged through a space within the gear case 18 and the inside of the a boss portion of the propeller 20 into the water.

Figure 2:
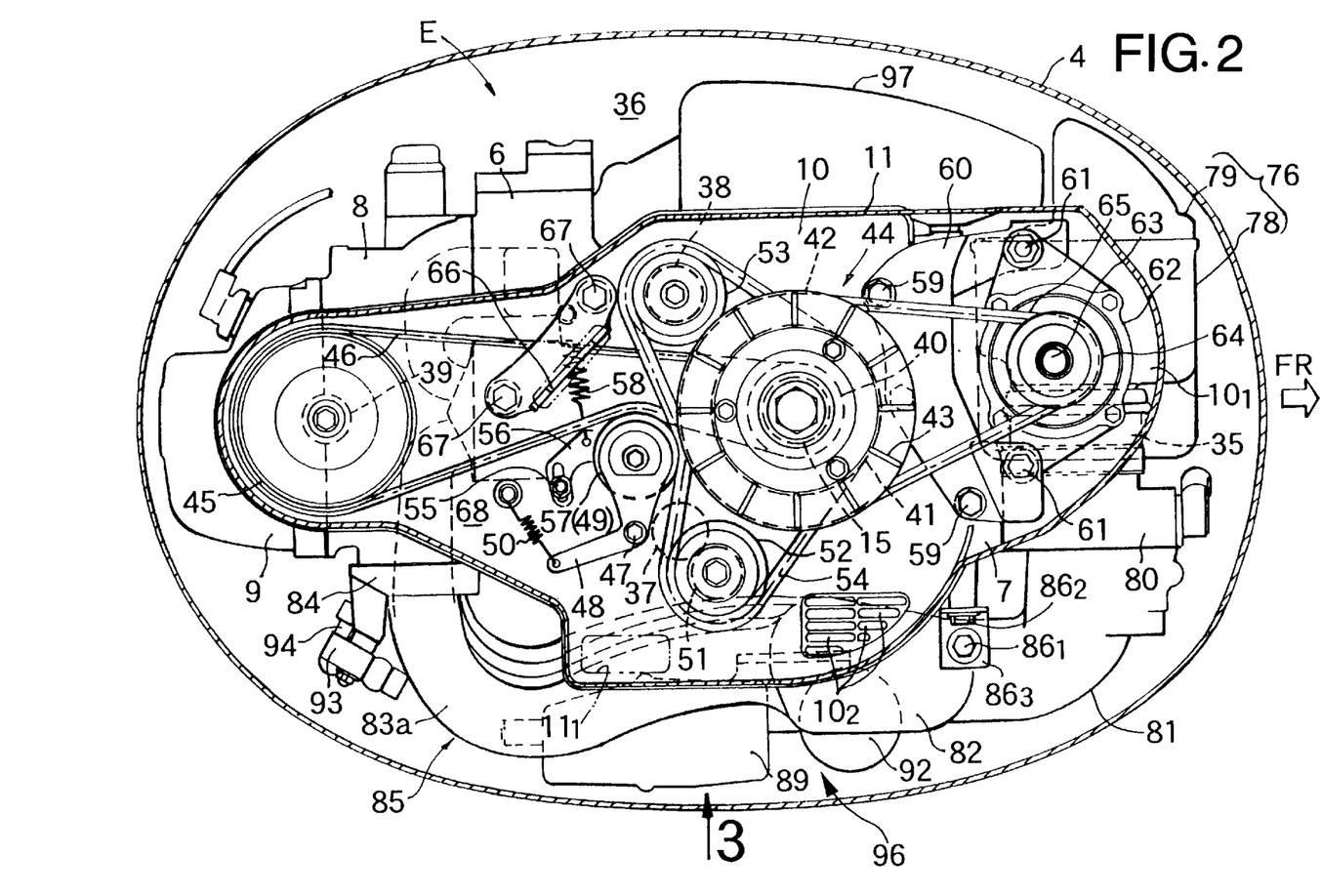
FIG. 2 is an enlarged sectional view taken along a line 2—2 in FIG. 1.

As can be seen from FIG. 2, the engine E accommodated in an engine room 36 defined by the under-case 3 and the engine cover 4 includes two secondary balancer shafts 37 and 38 disposed in parallel to the crankshaft 15, and a single cam shaft 39. The secondary balancer shafts 37 and 38 are supported in the cylinder block 6 at locations nearer the cylinder head 8 than the crankshaft 15, and the cam shaft 39 is supported on mating faces of the cylinder head 8 and the head cover 9.

A pulley assembly 44 is fixed to an upper end of the crankshaft 15 and comprised of a cam shaft drive pulley 40, a secondary balancer shaft drive pulley 41, a generator drive pulley 42 and a cooling fan 43 which are formed integrally with one another. A cam shaft follower pulley 45 fixed to an upper end of the cam shaft 39 and the cam shaft drive pulley 40 are connected to each other by an endless belt 46. The diameter of the cam shaft drive pulley 40 is set at one half of the diameter of the cam shaft follower pulley 45, so that the cam shaft 39 is rotated at a speed which is one half of the speed of the crankshaft 15. A tension pulley 49 mounted at one end of an arm 48 pivotally supported by a pin 47 is urged against an outer surface of the endless belt 46 by the resilient force of a spring 50, thereby providing a predetermined tension to the endless belt 46.

A pair of secondary balancer shaft follower pulleys 52 and 53 are fixed respectively to an intermediate shaft 51 mounted in the vicinity of one of the secondary balancer shaft 37 and to the other secondary balancer shaft 38. The secondary balancer shaft follower pulleys 52 and 53 and the secondary balancer shaft drive pulley 41 are connected to each other by the endless belt 54. A tension pulley 57 is mounted at one end of an arm 56 pivotally supported by a pin 55 and urged against an outer surface of the endless belt 54 by the resilient force of a spring 58, thereby providing a predetermined tension to the endless belt 54. An intermediate shaft 52 and the one secondary balancer shaft 37 are interconnected by a pair of gears (not shown) having the same diameter, and the diameter of the secondary balancer shaft drive pulley 41 is set at two times the diameter of the secondary balancer shaft follower pulleys 52 and 53. Therefore, the pair of secondary balancer shafts 37 and 38 are rotated in opposite directions at a speed two times that of the crankshaft 15.

A generator 62 is supported by two bolts 61, 61 on a bracket 60 which is fixed to an upper surface of the crankcase 7 by two bolts 59, 59. A generator follower pulley 64 fixed to a rotary shaft 63 of the generator 62 and the generator drive pulley 42 are interconnected by the endless belt 65, and the generator 62 is driven by the crankshaft 15. Since the generator 62 is mounted separately from the engine E in the above manner, the general-purpose generator 62 can be used, which is convenient for the cost and moreover, the capacity of the generator 62 can easily be increased, as compared with the case where the generator is incorporated into the flywheel mounted on the crankshaft 15.

An engine hanger 66 engaged by a hook of a chain block or a crane in hanging down the outboard engine system O is fixed by two bolts 67, 67 between the cam shaft 39 and the other secondary balancer shaft 38. The engine hanger 66 is positioned slightly at the rear of the position of the gravity center of the outboard engine system O, and it is taken into consideration that the outboard engine system O hung down by the engine hanger 66 can easily be mounted at and removed from the stern S as a forward-leaned attitude in which the lower end of the outboard engine system has leaped up slightly rearwards.

Three belts 46, 54 and 65 for driving the cam shaft 39, the secondary balancer shafts 37 and 38 and the generator 62 are accommodated in a belt chamber 68 defined by the lower and upper belt covers 10 and 11. The lower belt cover 10 has an opening $10_1$ surrounding the periphery of the generator 62, and a plurality of slits $10_2$ in its bottom wall on the right of the crankshaft 15, so that air is introduced into the belt chamber 68 through the opening $10_1$ and the slits $10_2$. An upper end of the engine hanger 66 protrudes upwards through the upper belt cover 11.

Figure 3:
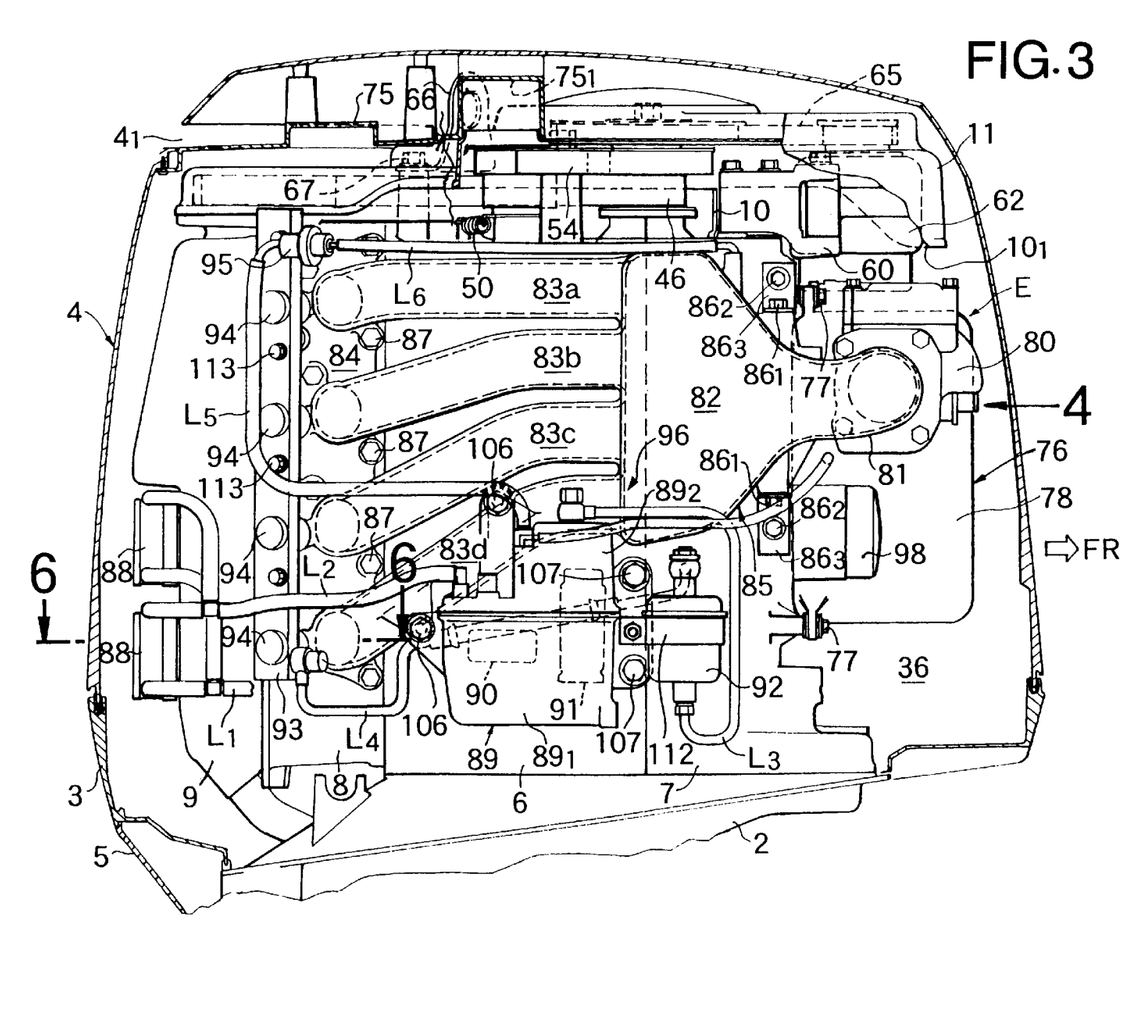
FIG. 3 is a view taken in the direction of an arrow 3 in FIG. 2.
Figure 4:
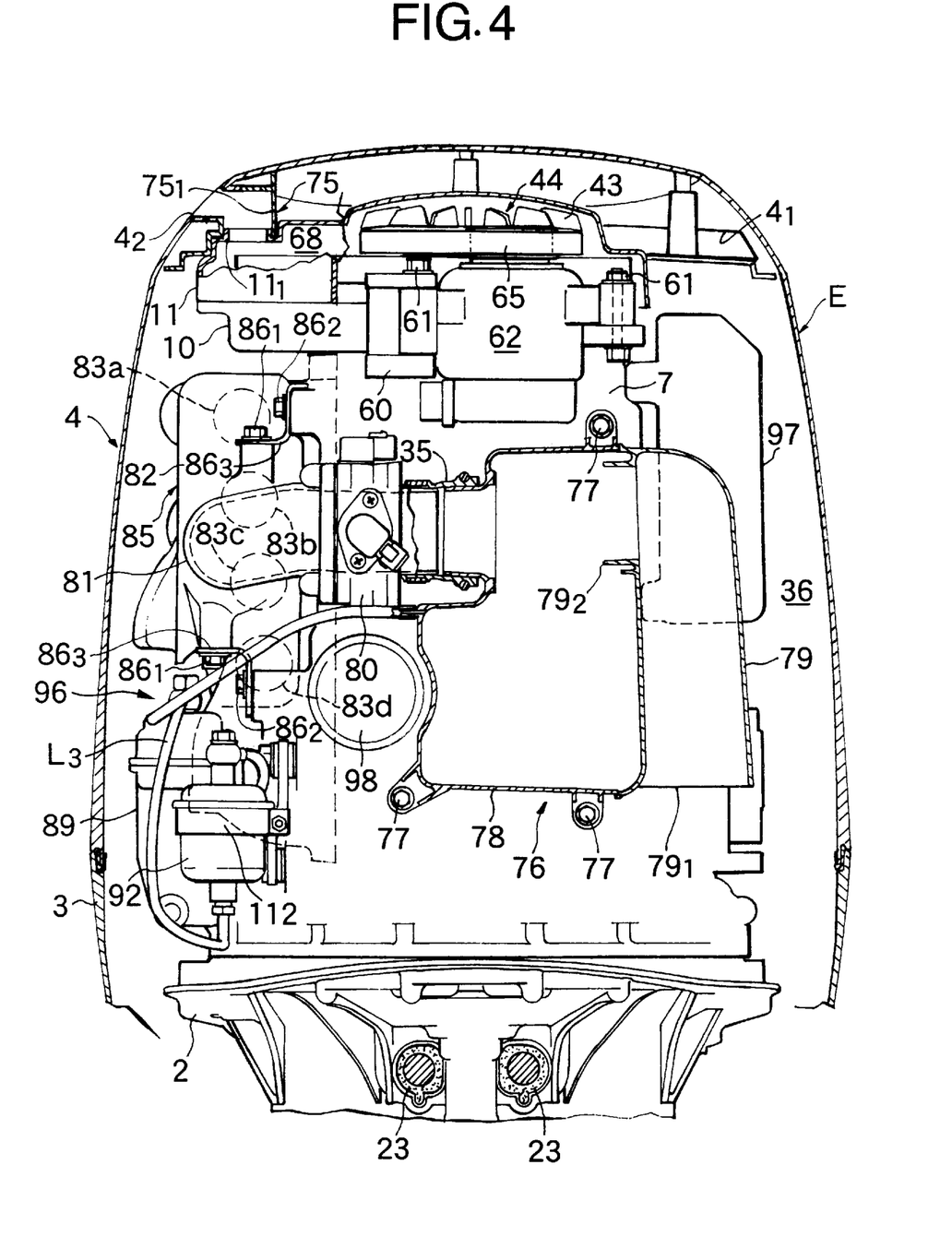
FIG. 4 is a view taken in the direction of an arrow 4 in FIG. 3.

As can be seen from FIGS. 2 to 4, a pair of left and right slit-shaped air intake bores $4_1$, $4_1$ are defined in a rear surface of an upper portion of the engine cover 4, and a guide plate 75 extending forwards from lower edges of the air intake bores $4_1$, $4_1$ is fixed to an inner surface of the engine cover 4. Therefore, air drawn from the air intake bores $4_1$, $4_1$ flows forwards through a space defined between an upper wall of the engine cover 4 and the guide plate 75 to enter the engine room 36 from a front edge of the guide plate 75. A ventilating duct $75_1$ (see FIG. 4) is formed in a right side of the guide plate 75, so that its lower end communicates with an opening $11_1$ defined in a right side of the upper belt cover 11 and its upper end communicates with an opening $4_2$ defined in a right side of the upper portion of the engine cover 4. The ventilating duct $75_1$ permits the belt chamber 68 surrounded by the lower and upper belt covers 10 and 11 to be put into communication with the open air, thereby performing the ventilation.

The structure of an intake system of the engine E will be described below with reference to FIGS. 2 to 5D.

An intake silencer 76 is fixed to a front surface of the crankcase 7 by three bolts 77. The intake silencer 76 comprises a box-shaped body portion 78, and a duct portion 79 coupled to a left side of the body portion 78. The duct portion 79 has an intake opening $79_1$ provided downwards in its lower end, and a communication bore $79_2$ provided in its upper end to communicate with an internal space in the body portion 78. A throttle body 80 is disposed in front of the crankcase 7 and in a right side of the body portion 78 of the intake silencer 76, and is connected to the body portion 78 through a short intake duct 35 having flexibility.

The throttle body 80 is connected and fixed to an intake manifold 85 which will be described below. The intake manifold 85 is disposed to extend along a right side of the engine E and is integrally provided with an elbow 81, a surge tank 82, four intake pipes 83a, 83b, 83c and 83d and a mounting flange 84. The elbow 81 serves to change the flow of intake air by approximately 90° from the flow along the front surface of the crankcase 7 to the flow along a right side of the crankcase 7. The elbow 81 may be a duct having flexibility, but is integral with the surge tank 82, the intake pipes 83a, 83b, 83c and 83d and the mounting flange 84 in order to support and fix the throttle body 80 in this embodiment.

A connecting portion between the elbow 81 and the surge tank 82 of the intake manifold 85 has a size vertically smaller than upper and lower ends of the surge tank 82. The intake manifold 85 is fixed at this portion to a right sidewall of the crankcase 7 by bolts $86_1$, $86_1$; $86_2$, $86_2$ and two brackets $86_3$, $86_3$ having loose bores. Further, the mounting flange 84 is fixed to an intake manifold mounting surface 81 formed on a right side of the cylinder head 8 by a plurality of bolts 87.

As can be seen from FIG. 3, the first intake pipe 83a which is first from above, extends substantially horizontally along a lower surface of the lower belt cover 10, but the second, third and fourth intake pipes 83b to 83d which are second, third and fourth from above, respectively, are disposed in such a manner that it is inclined upwards from the mounting flange 84 toward the surge tank 82. The inclination angle of the fourth intake pipe 83d is large; the inclination angle of the third intake pipe 83c is medium; and the inclination angle of the second intake pipe 83b is small. By disposing the intake pipes 83b, 83c and 83d in the inclined manner as described above, that portion of the fuel injected from fuel injection valves 94 (which will be described hereinafter), which remains within the intake pipes 83b, 83c and 83d, can be returned immediately into the cylinders 12 by the gravity, and further, a space can be ensured below the surge tank 82 and the fourth intake pipe 83d, and a high-pressure fuel supply means which will be described hereinafter can be disposed in the space. Moreover, the uppermost first intake pipe 83a disposed substantially horizontally cannot protrude to the upper surface of the cylinder block 6, whereby the interference of the lower belt cover 10 with the first intake pipe 83a can be avoided.

The lengths of the intake pipes 83a, 83b, 83c and 83d exert a large influence to the output from the engine E under a pulsating effect of the intake system. However, if the inclination angles of the intake pipes 83a, 83b, 83c and 83d are different from one another as described above, the length of the horizontal first intake pipe 83a is the shortest, and the length of the fourth intake pipe 83d having the large inclination angle is the largest. Therefore, in this embodiment, dispersion of the lengths of the intake pipes is compensated by offsetting the positions of connections at which upstream ends of the four intake pipes 83a, 83b, 83c and 83d are connected to the surge tank 82 with respect to the intake manifold mounting surface $8_1$ of the cylinder head 8 to which the mounting flange 84 at the downstream end is fixed, as shown in FIGS. 4 and 5D. More specifically, the offset amounts Da, Db, Dc and Dd of the first, second, third and fourth intake pipes 83a, 83b, 83c and 83d from the intake manifold mounting surface $8_1$ are set, so that the off set amount of the intake pipe is larger, as the inclination angle of the intake pipe is smaller, i.e., a relation, Da>Db, Dc>Dd is established.

Figure 5A:
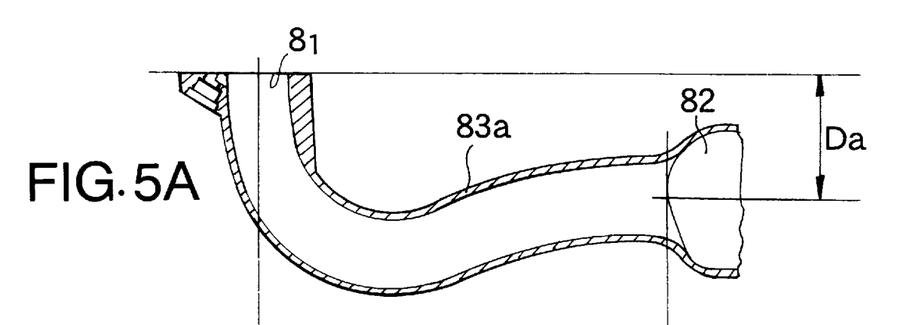
FIGS. 5A to 5D are diagrams showing the shapes of intake pipes.
Figure 5B:
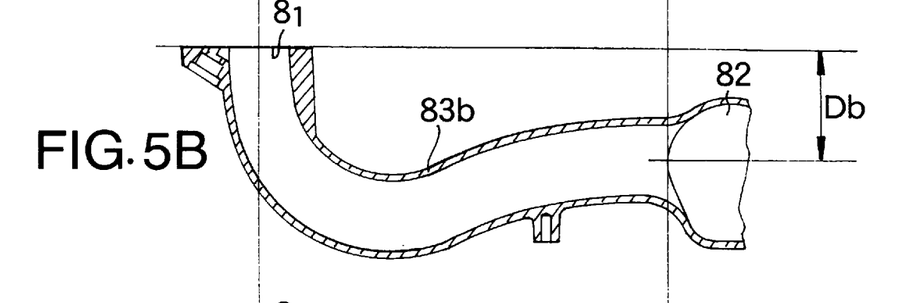
Figure 5C:
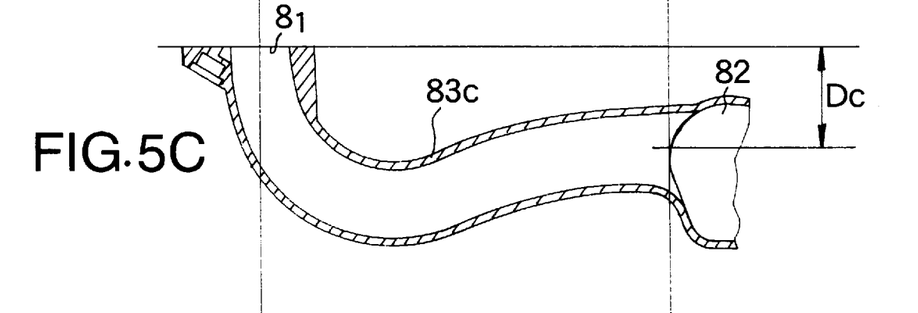
Figure 5D:
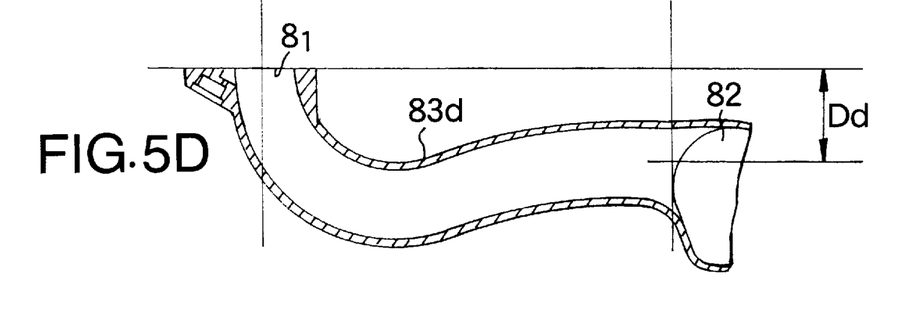
Figure 6:
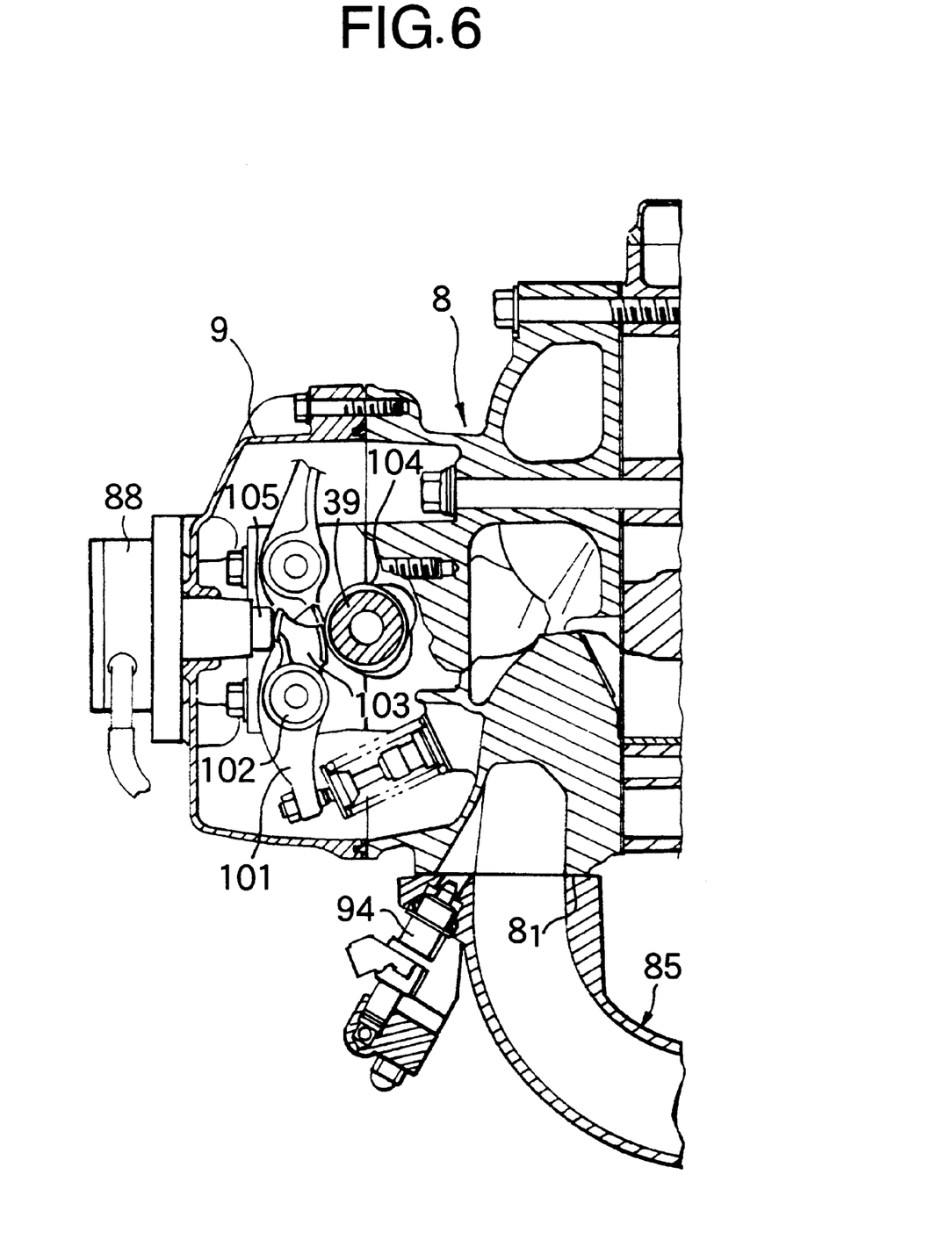
FIG. 6 is a sectional view taken along a line 6—6 in FIG. 3.

As a result, the decrement in length of the first intake pipe 83a shown in FIG. 5A due to the horizontal disposition thereof is compensated by the large offset amount Da, and the increment in length of the fourth intake pipe 83d shown in FIG. 5D due to the disposition thereof in the largely inclined state is compensated by the small offset amount Dd, whereby the lengths of the four intake pipes 83a, 83b, 83c and 83d can substantially be equalized to one another. By eliminating the dispersion of the lengths of the four intake pipes 83a, 83b, 83c and 83d in the above manner, a reduction in output from the engine E can be prevented.

In the intake system, the surge tank 82 is located on the side of the crankcase 7 and hence, it is unnecessary to prolong the lengths of the intake pipes 83a to 83d uselessly, and the output can be effectively increased in a high rotational range of the engine E. Moreover, the throttle body 80 can be disposed on the front surface of the crankcase 7 by virtue of the elbow 81 and hence, the dimension of forward protrusion of the throttle body 80 from the surge tank 82 can be decreased, which can contribute to a reduction in size of the engine E, as compared with a system in which the surge tank 82 and the throttle body 80 are longitudinally connected to each other to provide a straight flow of intake air.

The structure of the fuel supply system in the engine E will be described below with reference to FIGS. 2 to 4, 6 and 7.

Two low-pressure fuel pumps 88, 88 each comprising a plunger pump are mounted in parallel on a rear surface of the head cover 9, so that the fuel drawn from a fuel tank (not shown) mounted within a boat through a fuel supplying pipe $L_1$ is supplied by the low-pressure fuel pumps 88, 88 through a fuel supplying pipe $L_2$ into a subsidiary tank 89 mounted on a right side of the cylinder block 6. As can be seen from FIG. 6, a pump driving rocker arm 103 is coaxially supported on an intake rocker arm shaft 102 supporting an intake rocker arm 101 thereon, so that one end of the pump driving rocker arm 103 abuts against a pump cam 104 provided on the cam shaft 39, while the other end abuts against a plunger 105 of the low-pressure fuel pumps 88, 88, whereby the low-pressure fuel pumps 88, 88 are driven by the cam shaft 39.

Figure 7:
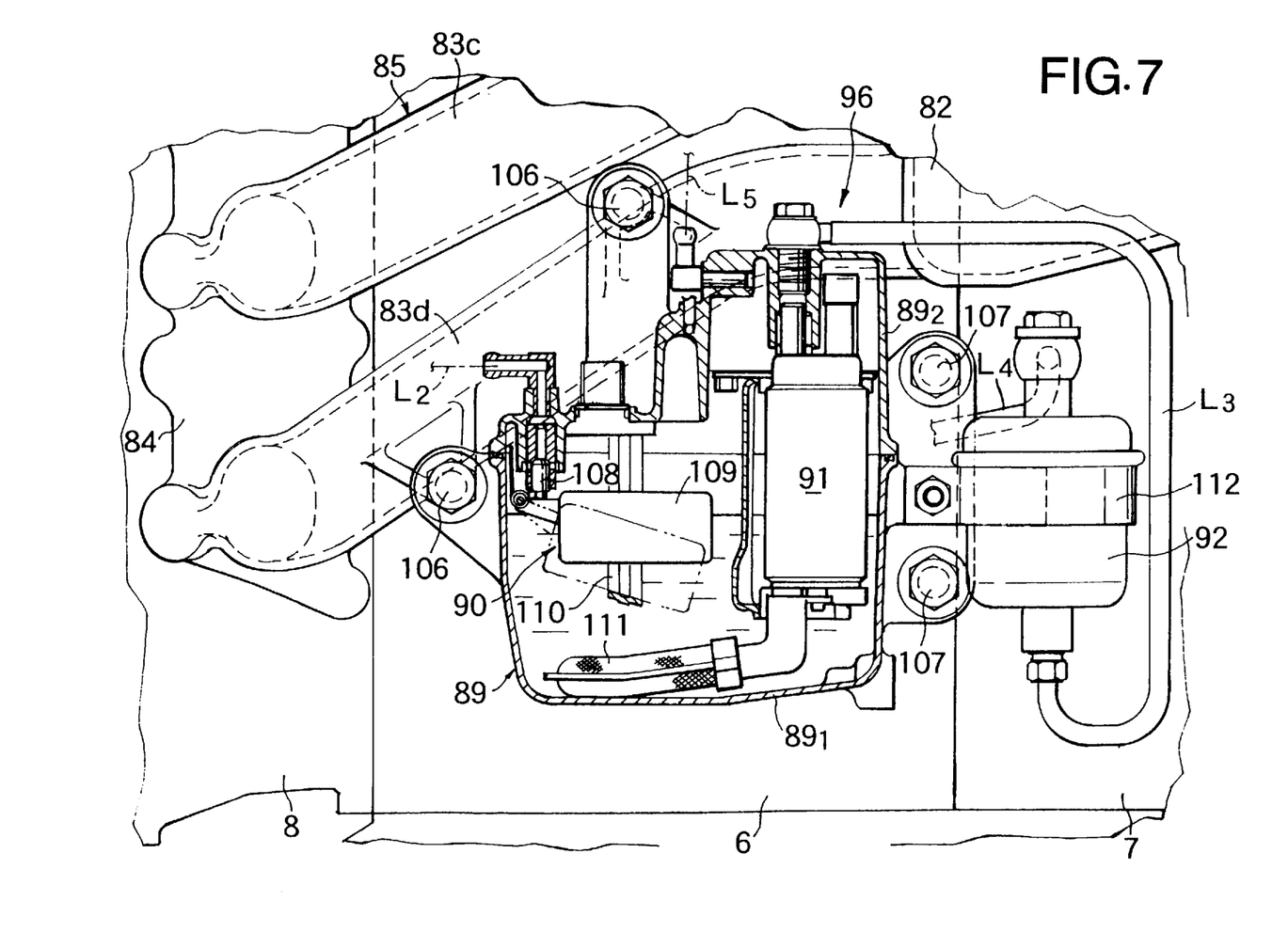
FIG. 7 is an enlarged sectional view of an essential portion shown in FIG. 3.

As can be seen from FIGS. 3 and 7, the subsidiary tank 89 is divided into two portions: a lower-side body portion $89_1$ and an upper-side cap $89_2$. The body portion $89_1$ is fixed to two bosses formed on the fourth intake pipe 83d by bolts 106, 106 and fixed to the cylinder block 6 by two bolts 107, 107. A float valve 90 for regulating the fuel level and a high-pressure fuel pump 91 comprising an electromagnetic pump are accommodated within the subsidiary tank 89.

The float valve 90 comprises an on-off valve 108 mounted at a location where the fuel supplying pipe $L_2$ extending from the low-pressure fuel pumps 88, 88 is connected to the subsidiary tank 89, a float 109 for moving upward and downward following the fuel level and for opening and closing the on-off valve 108, and a guide member 110 for guiding the upward and downward movements of the float 109. The float valve 90 is adapted to open the on-off valve 108 to introduce the fuel from the low-pressure pumps 88, 88 into the subsidiary tank 89, when the fuel level is lowered, and to close the on-off valve 108 to block the reception of the fuel from the low-pressure pumps 88, 88, when the fuel level is raised. The high-pressure pump 91 is disposed vertically and adapted to pump the fuel drawn from a strainer 111 disposed to extend along a bottom wall of the subsidiary tank 89, through a fuel supplying pipe $L_3$ into a high-pressure filter 92 which is fixed to a front portion of the subsidiary tank 89 by a band 112.

A fuel rail 93 is fixed to the mounting flange 84 of the intake manifold 85 by a plurality of bolts 113, and four fuel injection valves 94 corresponding to the four cylinders 12 are fixed to the mounting flange 84, so that the fuel supplied from the high-pressure filter 92 through a fuel supplying pipe $L_4$ to a lower end of the fuel rail 93 is distributed to the four fuel injection valves 94. A regulator 95 is mounted as a surplus fuel feeding-back means at an upper end of the fuel rail 93 and adapted to regulate the pressure of the fuel supplied to the fuel injection valves 94 and to return a surplus amount of the fuel to the subsidiary tank 89 through a fuel returning pipe $L_5$. To regulate the preset pressure in the regulator 95, the regulator 95 and the surge tank 82 are interconnected through a negative pressure pipe $L_6$.

The subsidiary tank 89, the high-pressure fuel pump 91, the high-pressure filter 92, the fuel rail 93 and the regulator 95 form a high-pressure fuel supply means 96. As can be seen from FIG. 2, the intake manifold 85 and the high-pressure fuel supply means 96 are disposed along the right side of the cylinder block 6, and an electric equipment box 97 is disposed along the left side of the cylinder block 6. By disposing the intake manifold 85 as well as the high-pressure fuel supply means 96 and the electric equipment box 97 in a manner that they are distributed on the left and right sides of the cylinder axis, as described above, the internal space in the engine room 36 can be effectively utilized to form the outboard engine system O compactly. A reference character 98 in FIGS. 3 and 4 denotes a cartridge-type oil filter.

When the engine E is to be assembled, the high-pressure fuel supplying means 96 is previously assembled to the intake manifold 85 to form a subassembly, whereby the number of assembling steps can be decreased to enhance the workability. More specifically, the subsidiary tank 89 having the float valve 90 and the high-pressure fuel pump 91 incorporated therein is fixed by the two bolts 106, 106 to the third and fourth intake pipes 83c and 83d of the intake manifold 85 having the fuel injection valves 94 mounted to the mounting flange 84 and further, the high-pressure filter 92 is fixed to the subsidiary tank 89 using the band 112. The fuel rail 93 connecting the four fuel injection valves 94 together is fixed to the mounting flange 84 of the intake manifold 85 by the bolts 113, and the regulator 95 is fixed to the fuel rail 93.

Then, one end of the fuel supplying pipe $L_2$ is connected to the float valve 90 of the subsidiary tank 89. The high-pressure fuel pump 91 of the subsidiary tank 89 and the high-pressure filter 82 are interconnected by the fuel supplying pipe $L_3$, and the high-pressure filter 82 and the lower end of the fuel rail 93 are interconnected by the fuel supplying pipe $L_4$. In addition, the regulator 95 and the subsidiary tank 89 are interconnected by the fuel returning pipe $L_5$ and further, the regulator 95 and the surge tank 82 are interconnected by the negative pressure pipe $L_6$. Thus, if the high-pressure fuel supplying means 96 and the intake manifold 85 are previously assembled as the subassembly, the assembling can be completed only by fixing the intake manifold 85 to the cylinder head 8 by the plurality of bolts 87 and fixing the subsidiary tank 89 to the cylinder block 6 by the two bolts 107, 107 and then, connecting the other end of the fuel supplying pipe $L_2$ to the low-pressure fuel pumps 88, 88. By previously assembling the high-pressure fuel supplying means 96 to the intake manifold 85 to form the subassembly in the above manner, the number of assembling steps can be remarkably decreased.

Although the embodiment of the present invention has been described in detail, it will be understood that the present invention is not limited to the above-described embodiment, and various modifications in design may be made without departing the subject matter of the present invention.

For example, the engine E of the outboard engine system O has been illustrated in the embodiment, but the present invention is applicable to an engine used in an application other than the outboard engine system O.

What is claimed is:

1. An intake manifold in an engine having a crankshaft (15) supported substantially vertically in an engine block comprised of a cylinder head (8), a cylinder block (6) and a crankcase (7), and an intake silencer (76) and a throttle body (80) which are disposed on a side of said crankcase (7) intersecting a cylinder axis, characterized in that said intake manifold is integrally comprised of;

a mounting flange (84) connected to a mounting surface ($8_1$) of said cylinder head (8);

a plurality of intake pipes (83a, 83b, 83c and 83d) extending side by side along the cylinder axis from said mounting flange (84) to a side of said cylinder block (6);

a surge tank (82) which is disposed on a side of said crankcase (7) that is on the same side as said side of said cylinder block (6), upstream ends of said intake pipes (83a, 83b, 83c and 83d) being connected to said surge tank; and a substantially L-shaped elbow (81) which connects said throttle body (80) disposed on the side of said crankcase (7) intersecting said cylinder axis to an upstream end of said surge tank (82).

2. An intake manifold in an engine according to claim 1, characterized in that an uppermost one of said intake pipes (83a, 83b, 83c and 83d) is disposed substantially horizontally, and lower intake pipes are disposed at inclination angles to be directed upwards toward the surge tank (82), with the inclination angles being larger for lower ones of the intake pipes.

3. An intake manifold in an engine according to claim 2, characterized in that amounts (Da, Db, Dc and Dd) of offsetting of connections of the upstream ends of said intake pipes (83a, 83b, 83c and 83d) with said surge tank (82) from the mounting surface ($8_1$) are set, so that said offsetting amount is larger for the upper intake pipe (83a, 83b, 83c, 83d).

4. An intake manifold in an engine having a plurality of cylinders (12) disposed in parallel to one another in an axial direction of a crankshaft (15) and an intake manifold (85) mounted to a mounting surface ($8_1$) of a cylinder head (8) in said engine (E), said intake manifold integrally comprising a plurality of intake pipes (83a, 83b, 83c and 83d) extending along a side of a cylinder block (6) and connected to the cylinders (12), and a surge tank (82) which is connected with upstream ends of said intake pipes (83a, 83b, 83c and 83d), wherein angles formed by said intake pipes (83a, 83b, 83c and 83d) with respect to the axial direction of said cylinders (12) as viewed from a direction perpendicular to the side of said cylinder block (6) are different from one another, characterized in that amounts (Da, Db, Dc and Dd) of offsetting of connections of the upstream ends of said intake pipes (83a, 83b, 83c and 83d) with said surge tank (82) from said mounting surface ($8_1$) are set so that the offsetting amount is larger for the intake pipe (83a, 83b, 83c, 83d) forming a smaller angle with the axial direction of said cylinders (12).

* * * * *